United States Patent [19]

Conneally

[11] Patent Number: 4,696,213

[45] Date of Patent: Sep. 29, 1987

[54] TOOL FINE ADJUSTMENT MECHANISM

[75] Inventor: Martin L. Conneally, Lombard, Ill.

[73] Assignee: Sears, Roebuck & Co., Chicago, Ill.

[21] Appl. No.: 815,525

[22] Filed: Jan. 2, 1986

[51] Int. Cl.[4] .......................... B23Q 3/02; B26D 7/01

[52] U.S. Cl. .......................................... 83/438; 33/446; 83/468; 269/318

[58] Field of Search .......................... 83/438, 467, 468; 269/303, 304, 315, 318, 320; 33/443, 446

[56] References Cited

U.S. PATENT DOCUMENTS

| | | | |
|---|---|---|---|
| 2,018,831 | 10/1935 | Boker . | |
| 2,037,283 | 4/1936 | Strachan et al. . | |
| 2,075,282 | 3/1937 | Hedgpeth | 83/438 |
| 2,166,703 | 7/1939 | Boice | 83/438 |
| 2,267,937 | 12/1941 | Mattison | 83/471 X |
| 2,273,715 | 2/1942 | Lonskey et al. | 83/438 |
| 2,325,082 | 7/1943 | Tautz | 83/438 |
| 2,521,302 | 9/1950 | Musselman . | |
| 2,556,548 | 6/1951 | Modderman . | |
| 2,562,246 | 7/1951 | Van Dam et al. | 83/438 |
| 2,677,400 | 5/1954 | Gaskell . | |
| 2,806,493 | 9/1957 | Gaskell . | |
| 2,945,516 | 7/1960 | Edgemond et al. | 83/438 X |
| 2,966,179 | 12/1960 | Gaskell | 83/438 |
| 3,635,112 | 1/1972 | Johnson | 83/402 |
| 4,187,755 | 2/1980 | Shirai | 83/882 |

FOREIGN PATENT DOCUMENTS

| | | | |
|---|---|---|---|
| 79356 | 4/1919 | Switzerland | 33/143 |

*Primary Examiner*—Donald R. Schran
*Assistant Examiner*—Hien H. Phan
*Attorney, Agent, or Firm*—Wood, Dalton, Phillips, Mason & Rowe

[57] ABSTRACT

A tool having a laterally slidable adjustment structure including a corresponding track and guide slidable thereon. The tool also includes a mechanism for releasably securing the guide on the track in a selected position of adjustment. Additionally, the tool is provided with a friction drive arrangement operatively associated with the guide and in engagement with the track.

14 Claims, 7 Drawing Figures

TOOL FINE ADJUSTMENT MECHANISM

BACKGROUND OF THE INVENTION

The present invention relates to a fine adjustment mechanism for a tool and, more particularly, to a fine adjustment mechanism for a table saw fence assembly.

Conventionally, many tools have a laterally slidable adjustment means to provide maximum versitility in use. The adjustment means commonly includes corresponding tracks and guides slidable thereon together with means for releaseably securing the guides on the tracks in selected positions of adjustment. Unfortunately, it is usually very difficult to make fine adjustments with any degree of accuracy.

In the case of a table saw, the saw is typically provided with a pair of substantially parallel spaced apart tracks extending substantially transversely of a normal cutting direction. A fence assembly having an elongated fence extending between the tracks and substantially transversely of the tracks is usually provided so as to be substantially parallel to the normal cutting direction. Additionally, the fence assembly may typically include a pair of fence guides each of which is adapted to engage one of the tracks for sliding movement therealong.

As with other tools having a laterally slidable adjustment means, it is generally recognized that, at best, fine adjustments in the position of the fence are difficult to make. There has, in fact, been a long felt need for an improvement in table saws making it possible to accurately position the fence by making fine adjustments in its position in a minimum of time and without the difficulties presently encountered. Despite the recognition of this need, there has been no truly effective means for making fine adjustments in the position of a table saw fence.

There have been many attempts to overcome the perceived problems in fine adjustment means for tools of various types. Lonskey et al U.S. Pat. No. 2,273,715 and Boker U.S. Pat. No. 2,018,831 disclose hand rotatable means for adjusting the position of a slide block laterally with respect to a cutting device whereas Mattison U.S. Pat. No. 2,267,937 proposes the use of a set screw to laterally fix the fine position of a slide block after initial adjustment has been made. Additionally, Gaskell U.S. Pat. No. 2,806,493 proposes an adjustable table saw fence assembly utilizing rack and pinion means.

Modderman U.S. Pat. No. 2,556,548, Musselman U.S. Pat. No. 2,521,302 and Gaskell U.S. Pat. No. 2,677,400 propose various types of conventional table saw fence assemblies while Hedgepeth U.S. Pat. No. 2,075,282 proposes the use of a drive wheel operatively joined to a hand knob for making position adjustments in a fence assembly for a table saw.

Despite the prior attempts to provide for fine adjustment of a table saw fence assembly, it has remained to do so in an effective manner so as not to impede gross adjustment. It has also remained to do so in a manner accommodating very fine adjustment with a minimum of force and without the need to depart substantially or completely from conventional fence assembly construction. Accordingly, the present invention is directed to overcoming the above stated problems and accomplishing the stated objects.

SUMMARY OF THE INVENTION

Generally, the present invention is directed to tools having an adjustment means of the laterally slidable type. The adjustment means in such tools typically includes a corresponding track and guide slidable thereon as well as means for releaseably securing the guide on the track in a selected position of adjustment. For such tools, the present invention is directed to a friction drive means operatively associated with the guide in engagement with the track for making fine adjustments.

In a particular application, the friction drive means is utilized for a table saw and fence assembly where the table saw has a pair of substantially parallel spaced apart tracks. The tracks extend substantially transversely of a normal cutting direction and the fence assembly includes an elongated fence extending between the tracks and substantially transversely of the tracks so as to be substantially parallel to the normal cutting direction. Additionally, the fence assembly includes a pair of fence guides each adapted to engage one of the tracks for sliding movement therealong and means for releaseably securing the fence in a selected position of adjustment.

With this arrangement, the friction drive means is operatively associated with one of the fence guides in engagement with the corresponding one of the tracks. This makes it possible to make fine adjustments in the position of the fence when the releaseable securing means has been loosened and gross adjustments in the position of the fence have been made by sliding the fence guides along the tracks. Because of the unique construction utilized in the friction drive means of the invention, it does not interfere with the normal gross adjusting procedure of conventional fence assemblies.

Specifically, in a preferred embodiment, one of the fence guides includes a pair of spaced apart surfaces adapted to be disposed on opposite sides of the track in generally parallel relation thereto. The spaced apart surfaces of the fence guide are joined by a transversely extending wall disposed in generally parallel relation to the track with the wall having an opening facing outwardly away from the track so as to render the friction drive means accessible through the opening for manual operation thereof. Further, the friction drive means preferably includes a spool rotatable about an axis extending generally perpendicular to the spaced apart surfaces of the one of the fence guides.

Additional details of the preferred embodiment include a portion of the spool extending through the opening in the wall of the fence guide with the spool rotatably engaging the track for friction driven movement therealong. Advantageously, each of the spaced apart surfaces of the fence guide also have a slot extending transversely of the track for mounting the spool for both rotational and limited longitudinal movement therein by reason of the cooperation of axle portions of the spool disposed in each of the slots for retaining the spool in the fence guide in a manner accommodating such movement. Moreover, the spool preferably includes a pair of oppositely facing frustoconical drive surfaces engaging the track for friction driven rotational movement therealong.

Other objects and advantages will become apparent from the following specification taken in connection with the accompanying drawings.

DETAILED DESCRIPTION OF THE PREFERRED EMBODIMENT

Figure 1:
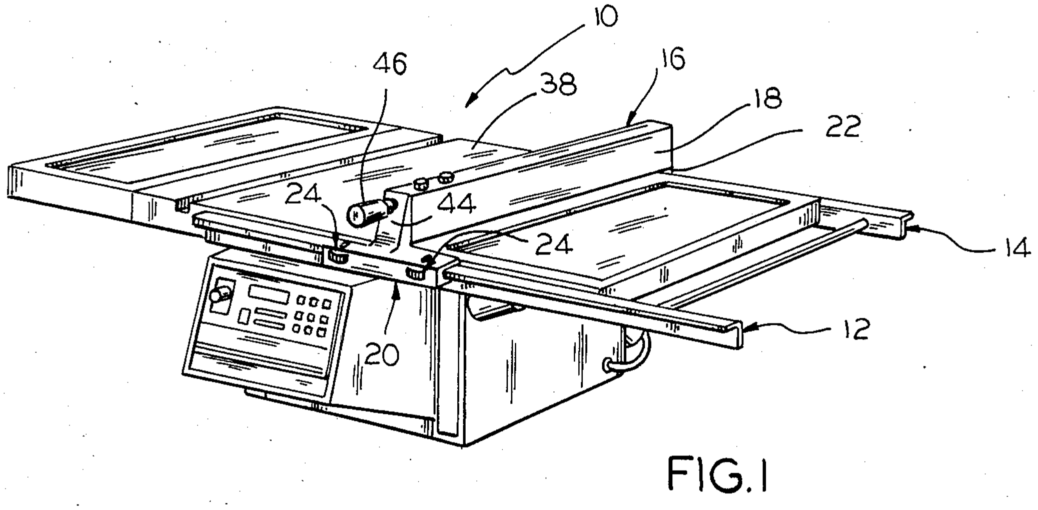
FIG. 1 is a perspective view of a table saw utilizing a friction drive means in accordance with the present invention.

An exemplary embodiment of a tool having laterally slidable adjustment means is illustrated in FIG. 1. The tool there illustrated is a table saw 10 having a pair of substantially parallel spaced apart tracks 12 and 14 extending transversely of a normal cutting direction and a fence assembly 16 including an elongated fence 18 extending between and substantially transversely of the tracks 12 and 14 so as to be substantially parallel to the normal cutting direction. In addition, the table saw 10 includes a pair of fence guides 20 and 22 each adapted to engage one of the tracks 12 and 14 for sliding movement therealong (see, also, FIG. 3).

Figure 3:
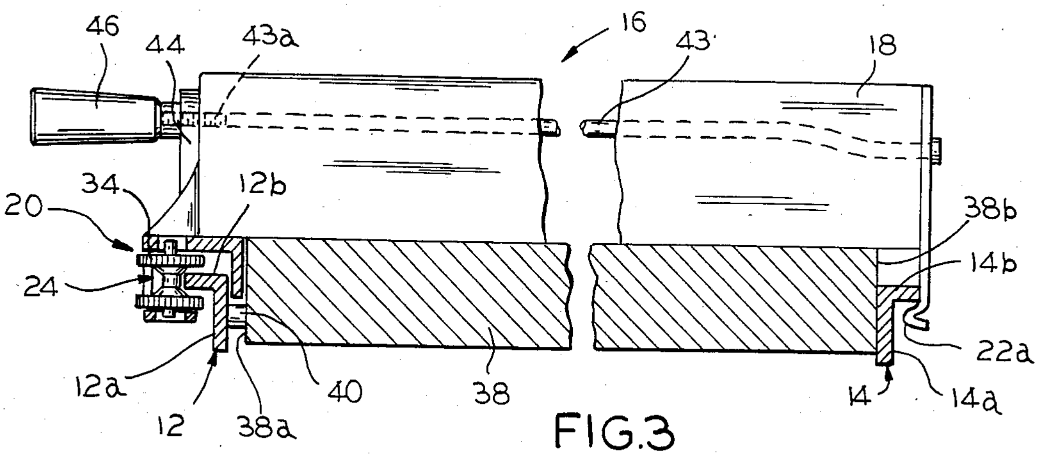
FIG. 3 is a partial side elevational view, partially in cross section, of the table saw of FIG. 1.
Figure 4:
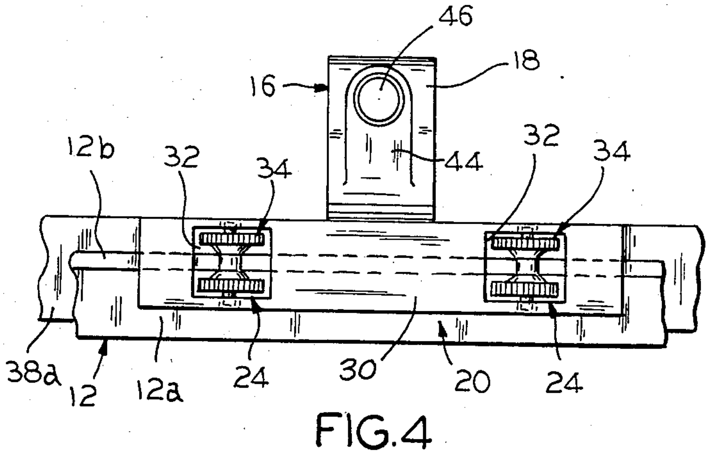
FIG. 4 is a partial front elevational view of the table saw of FIG. 1.
Figure 6:
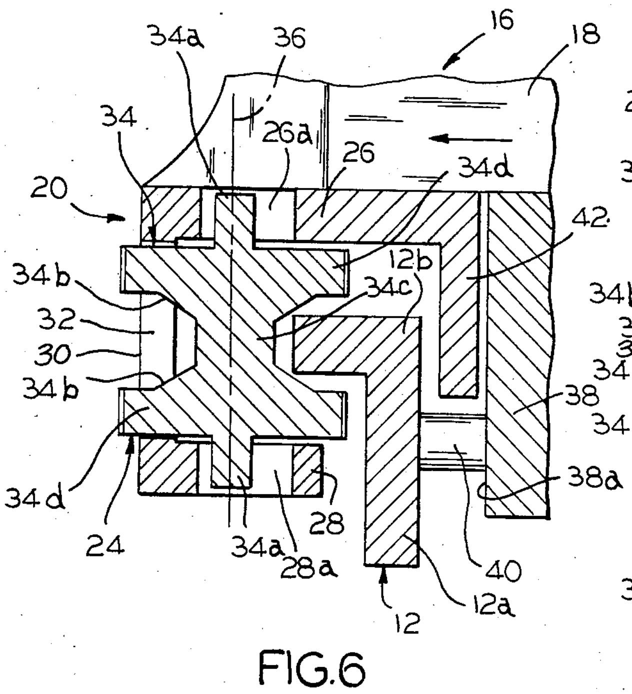
FIG. 6 is a partial cross sectional view, in a first position, of a drive means for the table saw of FIG. 1.
Figure 7:
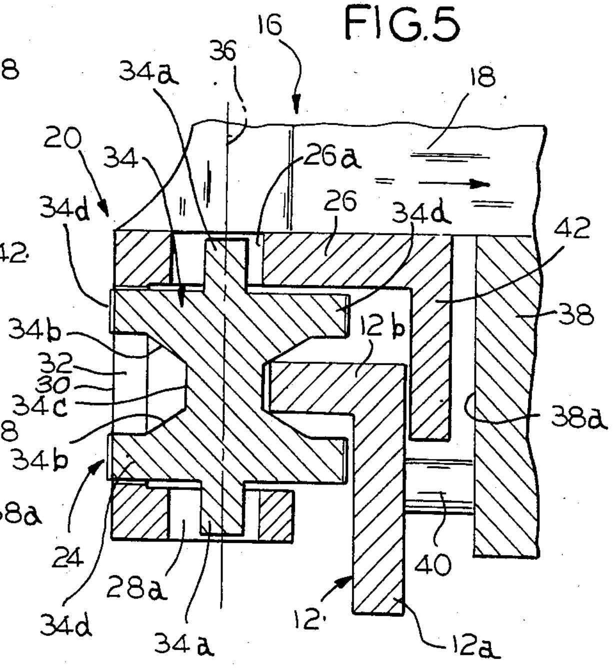
FIG. 7 is a partial cross sectional view, in a second position, of a drive means for the table saw of FIG. 1.

With the arrangement illustrated in FIGS. 1 and 3, the table saw 10 also includes friction drive means 24 operatively associated with one of the fence guides 20 in engagement with the corresponding one of the tracks 12 for making fine adjustments in the position of the fence 18. For this purpose, the fence guide 20 includes a pair of spaced apart surfaces 26 and 28 adapted to be disposed on opposite sides of the track 12 in generally parallel relation thereto with the spaced apart surfaces 26 and 28 being joined by a transversely extending wall 30 also disposed in generally parallel relation to the track 12. As shown in FIGS. 4, 6 and 7, the wall 30 is disposed in spaced relation to the track 12 and has at least one opening 32 facing outwardly of the track 12 and the friction drive means 24 is accessible through the opening 32 for manual operation thereof.

Figure 2:
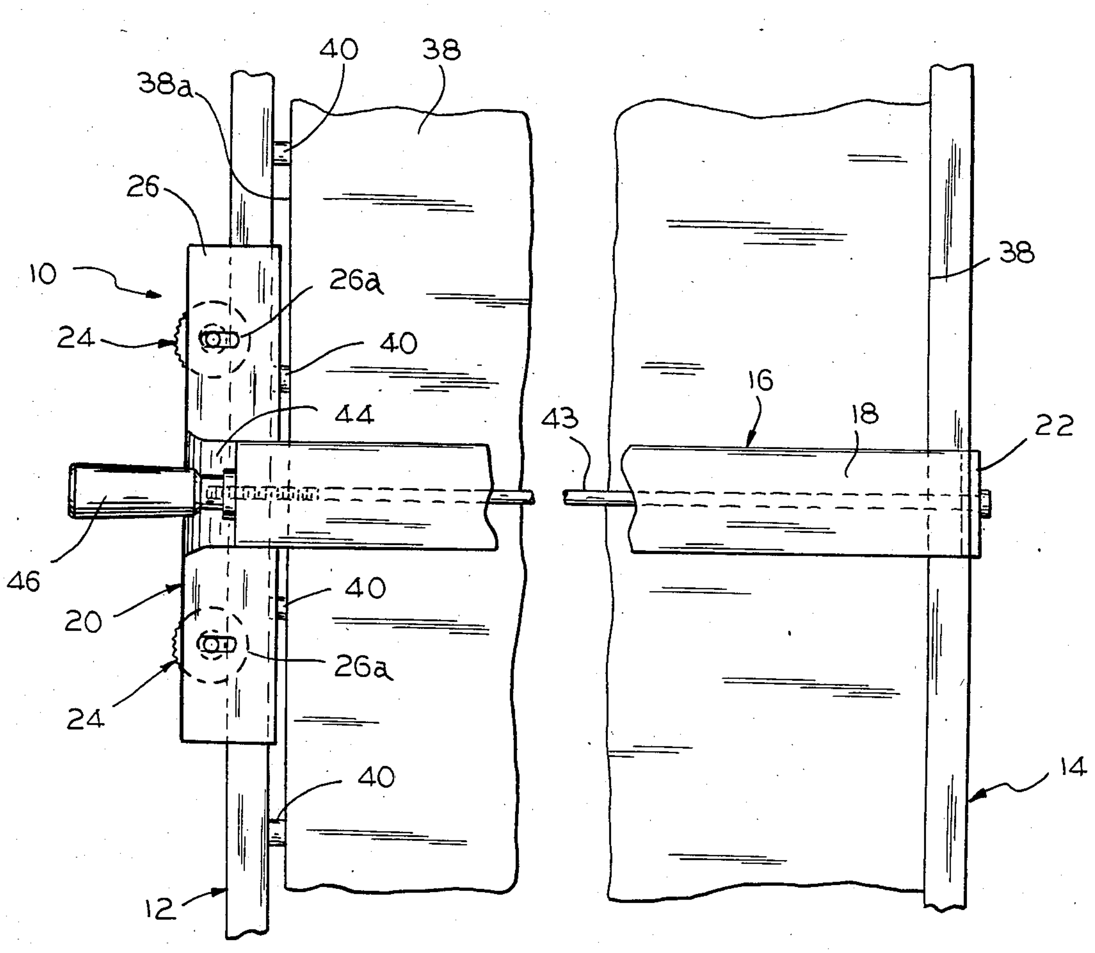
FIG. 2 is a partial plan view of the table saw of FIG. 1.

As will be appreciated by referring to FIGS. 3 through 7, the friction drive means 24 includes a spool 34 rotatable about an axis 36 extending generally perpendicular to the spaced apart surfaces 26 and 28 of the fence guide 20. A portion of the spool 34 extends through the opening 32 in the wall 30 of the fence guide 20 when the spool 34 is at the same time rotatably engaging the track 12 for friction driven movement therealong. Also, as best shown in FIGS. 2, 6 and 7, the spaced apart surfaces 26 and 28 of the fence guide 20 each have a slot **26*a* and 28*a*, respectively, extending transversely of the track 12 for mounting the spool 34** for both rotational and limited longitudinal movement therein.

Figure 5:
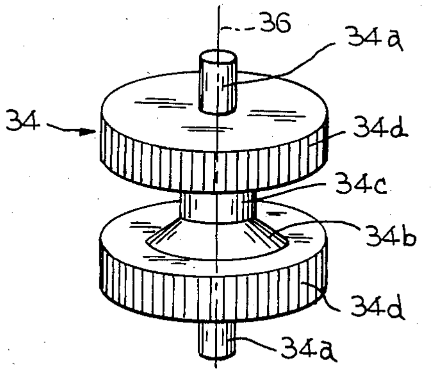
FIG. 5 is a perspective view of a friction drive means for the table saw of FIG. 1.

Referring specifically to FIGS. 5, 6 and 7, the spool 34 includes an axle portion **34*a* disposed in each of the slots 26*a* and 28*a* which serve to retain the spool 34 in the fence guide 20 for rotational and limited longitudinal movement therein in a manner to be described hereinafter. The spool 34 also includes a pair of oppositely facing frustoconical drive surfaces 34*b* engaging the track 12 for friction driven rotational movement therealong. As shown, the frustoconical drive surfaces 34*b* are joined by a generally cylindrical central core 34*c* and terminate in radially outwardly projecting cylindrical flanges 34*d* having a gripping surface portion extending through the opening 32 in the wall 30 of the fence guide 20**.

In the preferred embodiment, the tracks 12 and 14 are generally L-shaped in cross section as shown in FIGS. 3, 6 and 7. They also include respective generally vertically extending flange portions **12*a* and 14*a* and generally horizontally extending flange portions 12*b* and 14*b* with the vertically extending portions 12*a* and 14*a* being adapted to join the respective tracks 12 and 14 to the table 38 such that the track 12 is spaced outwardly from the end 38*a* of the table 38 by means of the spacers 40 while the track 14 is secured directly in abutment with the end 38*b* of the table 38. As will be appreciated, the difference in mounting the tracks 12 and 14 to the table 12 relates to the difference in construction of the fence guides 20 and 22 of the fence assembly 16**.

In particular, the fence guide 22 is in the form of a downwardly extending spring clip. The spring clip 22 includes an inwardly projecting lip portion **22*a* adapted to cooperate with the horizontally extending portion 14*b* of the track 14 when the fence assembly 16 has been secured in a selected position of adjustment. In contrast, the fence guide 20** as illustrated in the drawings is very different in construction.

As shown in FIGS. 3 and 4, the fence guide 20 includes a downwardly extending flange 42 adapted to be disposed in the space between the vertically extending portion **12*a* of the track 12 and the end 38*a* of the table 38 provided by the spacer 40. The position of the downwardly extending flange 42 accommodates lateral sliding movement of the fence guide 20 along the track 12 and, together with cooperation between the fence guide 22 and the track 14, makes it possible to make gross adjustments in the position of the fence assembly 16 on the table 38. As will be appreciated, the fence guides 20 and 22 can be joined to the fence 18** in any conventional manner and can also vary considerably in construction while still advantageously utilizing the features of the invention.

Referring specifically to FIG. 3, the fence assembly 16 includes a rod 43 extending from the fence guide 22, through the fence 18, and through an upstanding plate 44 integral with the fence guide 20. The rod 43 includes a threaded end **43*a* adapted to cooperate with an internally threaded handle 46 disposed opposite the plate 44 and in abutting relation thereto. Specifically, since the rod 43 is joined to the spring clip fence guide 22, the fence assembly 16 can be releaseably secured in a selected position of adjustment by tightening the grip of the spring clip fence guide 22 through the handle 46**.

With this construction, the spring clip fence guide 22, rod 43, plate 44, and internally threaded handle 46 comprise means for releaseably securing the fence 18 in a selected position of adjustment. It will be appreciated that gross adjustments in the position of the fence 18 can easily be made by loosening the handle 46 sufficiently to permit the entire fence assembly 16 to be moved laterally, i.e., transversely of the normal cutting direction of the table saw 10 until the fence 18 is very near a selected position of adjustment. When this has been done, the unique friction drive means of the present invention may be utilized to make fine adjustments in the position of the fence 18.

Specifically, with the handle 46 loosened, the fence assembly 16 can easily be moved until the fence 18 is close to a selected position of adjustment since the friction drive means 24 are not in friction driving engagement with the track 12 in a manner that might otherwise impede sliding movement of the entire fence assembly 16. However, once the fence assembly 16 is close to a selected position of adjustment, the friction drive means 24 can be utilized to make fine adjustments in the position of the fence 18 since the frustoconical surfaces 34*b* are in engagement with the sharp edges 12*b'* of the horizontally extending portion 12*b* of the track 12 as illustrated in FIG. 7.

Also, as shown in FIG. 7, the axle portions 34*a* are not in engagement with the outermost end of the slots 26*a* and 28*a*. Nevertheless, the mutual cooperation between the frustoconical surfaces 34*b* and the sharp edges 12*b'* by manually frictionally engaging the spools 34 with the track 12 define a unique friction drive means 24 for making fine adjustments in the position of the fence assembly 16 and, while it is possible to utilize a single rotatable drive spool 34, it is preferable to use a pair for increased frictional forces in order to move the fence assembly 16 with increased mechanical advantage. This is achieved not only because of the unique construction but also because the thumb or a finger from each hand can be used to frictionally drive the fence assembly 16.

While in the foregoing there has been set forth a preferred embodiment of the invention, it is to be understood that the invention is only to be limited by the spirit and scope of the appended claims.

I claim:

1. In a tool having a laterally slidable adjustment means including a corresponding track and guide slidable thereon, and having means for releasably securing said guide on said track in a selected position of adjustment, the improvement comprising:

friction drive means operatively associated with said guide so as to normally be free of friction driving engagement with said track, said friction drive means being selectively manually frictionally engageable with said track, said friction drive means cooperating with said track for making fine adjustments in the position of said laterally slidable adjustment means of said tool;

said guide including a pair of spaced apart surfaces adapted to be disposed on opposite sides of said track in generally parallel relation thereto, said spaced apart surfaces of said guide being joined by a transversely extending wall disposed in generally parallel relation to said track, said wall including an opening facing outwardly away from said track and said friction drive means being accessible through said opening for manual operation thereof;

said friction drive means including a rotatable member disposed about an axis extending generally perpendicular to said spaced apart surfaces of said guide, said rotatable member having a portion extending through said opening in said wall of said guide and frictionally engageable with said track for rotationally driven movement therealong.

2. The tool as defined by claim 1 wherein each of said spaced apart surfaces of said guide have a slot extending transversely of said track, said slots accommodating mounting of said rotatable member for both rotational and limited longitudinal movement therein, said rotatable member including an axle portion disposed in each of said slots for retaining said rotatable member in said guide.

3. The tool as defined by claim 1 wherein said rotatable member is a spool having a pair of oppositely facing frustoconical drive surfaces engaging said track for friction driven rotational movement therealong, said frustoconical drive surfaces being joined by a generally cylindrical core and terminating in radially outwardly projecting cylindrical flanges, said cylindrical flanges of said spool each having a gripping surface portion extending through said opening in said wall of said guide.

4. In a table saw having at least one track extending substantially transversely of a normal cutting direction and a fence assembly extending substantially transversely of said track so as to be substantially parallel to said normal cutting direction, said fence assembly including an elongated fence together with at least one fence guide adapted to engage said track for sliding movement therealong and means for releasably securing said fence in a selected position of adjustment, the improvement comprising:

friction drive means operatively associated with said fence so as to normally be free of friction driving engagement with said track, said friction drive means being selectively manually frictionally engageable with said track, said friction drive means cooperating with said track for making fine adjustments in the position of said fence;

said fence guide including a pair of spaced apart surfaces adapted to be disposed on opposite sides of said track in generally parallel relation thereto, said spaced apart surfaces of said fence guide being joined by a transversely extending wall disposed in generally parallel relation to said track, said wall including an opening facing outwardly away from said track such that said friction drive means is accessible through said opening for manual operation thereof;

said friction drive means including a spool rotatable about an axis extending generally perpendicular to said spaced apart surfaces of said fence guide.

5. The table saw as defined by claim 4 wherein a portion of said spool extends through said opening in said wall of said fence guide, said spool being selectively manually frictionally engageable with said track for rotationally driven movement therealong.

6. The table saw as defined by claim 5 wherein each of said spaced apart surfaces of said fence guide has a slot extending transversely of said track for mounting said spool for both rotational and limited longitudinal movement therein.

7. The table saw as defined by claim 6 wherein said spool includes an axle portion disposed in each of said slots, said axle portions retaining said spool in said fence guide for rotation and limited longitudinal movement therein.

8. The table saw as defined by claim 4 wherein said spool includes a pair of oppositely facing frustoconical drive surfaces, said drive surfaces engaging said track for friction driven rotational movement therealong.

9. The table saw as defined by claim 8 wherein said frustoconical drive surfaces are joined by a generally cylindrical central core, each of said frustoconical drive surfaces terminating in a radially outwardly projecting cylindrical flange.

10. The table saw as defined by claim 9 wherein each of said cylindrical flanges of said spool have a gripping surface portion extending through said opening in said wall of said fence guide.

11. In a table saw having a pair of substantially parallel spaced apart tracks extending substantially transversely of a normal cutting direction and a fence assembly extending substantially transversely of said tracks so as to be substantially parallel to said normal cutting direction, said fence assembly having an elongated fence extending between said tracks together with a pair of fence guides each adapted to engage one of said tracks for sliding movement therealong and means for releasably securing said fence in a selected position of adjustment, the improvement comprising:

one of said fence guides having a pair of generally parallel spaced apart surfaces adapted to be disposed about a corresponding portion of one of said tracks, said surfaces of said fence guide being joined by a wall extending generally transversely thereof and having a pair of spaced apart openings therein facing outwardly away from said portion of the corresponding one of said tracks, and friction drive means rotatable about axes extending generally perpendicular to said surfaces of said fence guide and accessible through said openings in said wall of the one of said fence guides, said friction drive means being operatively associated with the one of said fence guides and engageable with the corresponding one of said tracks for making fine adjustments in the position of said fence.

12. The table saw as defined by claim 11 wherein said friction drive means includes a pair of spools rotatable about axes extending generally perpendicular to said spaced apart surfaces of the one of said fence guides, said spools each having a portion extending through one of said openings in said wall of the one of said fence guides and rotatably engaging the corresponding one of said tracks for friction driven movement therealong.

13. The table saw as defined by claim 12 wherein said spaced apart surfaces of the one of said fence guides each have a pair of slots extending transversely of the corresponding one of said tracks for mounting said spools for both rotational and limited longitudinal movement therein, said spools including axle portions disposed in each of said slots in alignment with said openings in said wall of the one of said fence guides, said axle portions retaining said spools in the one of said fence guides for rotational and limited longitudinal movement therein.

14. The table saw as defined by claim 12 wherein said spools each include a pair of oppositely facing frustoconical drive surfaces, said drive surfaces engaging the corresponding one of said tracks for friction driven rotational movement therealong, said frustoconical drive surfaces being joined by a generally cylindrical central core, each of said frustoconical drive surfaces terminating in a radially outwardly projecting cylindrical flange, each of said cylindrical flanges of said spools having a gripping surface portion extending through the corresponding one of said openings in said wall of the one of said fence guides.

* * * * *